United States Patent [19]
Sakata et al.

[11] 3,946,091
[45] Mar. 23, 1976

[54] AROMATIC CO-POLYESTER ARTICLES SHOWING REDUCED CRAZING

[75] Inventors: Hiroshi Sakata, Kyoto; Takashi Okamoto, Hirakata; Hirozo Hasegawa, Uji, all of Japan

[73] Assignee: Unitika Limited, Amagasaki, Japan

[22] Filed: Nov. 15, 1974

[21] Appl. No.: 524,183

Related U.S. Application Data

[63] Continuation-in-part of Ser. No. 374,437, June 28, 1973, abandoned.

[30] Foreign Application Priority Data

June 28, 1972 Japan.............................. 47-64648

[52] U.S. Cl............................ 260/860; 260/33.8 R
[51] Int. Cl.$^2$......................................... C08G 39/02
[58] Field of Search................. 260/860, 47 R, 47 T

[56] References Cited
FOREIGN PATENTS OR APPLICATIONS
1,392,883   2/1965   United Kingdom

*Primary Examiner*—Donald E. Czaja
*Assistant Examiner*—T. Pertilla
*Attorney, Agent, or Firm*—Sughrue, Rothwell, Mion, Zinn & Macpeak

[57] ABSTRACT

A blend of an aromatic co-polyester and poly(etylene terephthalate) provides molded articles of reduced crazing.

14 Claims, No Drawings

AROMATIC CO-POLYESTER ARTICLES SHOWING REDUCED CRAZING

CROSS-REFERENCE TO RELATED APPLICATIONS

This application is a continuation-in-part application of copending application Ser. No. 374,437, filed June 28, 1973, now abandoned.

1. FIELD OF THE INVENTION

This invention relates to moldings, more particularly, to the manufacture of reduced crazing products from aromatic copolyesters as hereafter defined.

2. DESCRIPTION OF THE PRIOR ART

French Pat. No. 1,392,883 discloses a polyester blend which is very successfully processed into shaped articles. According to the above French Patent there is provided a polyester blend comprising one component which comprises a polyester of terephthalic acid and one or more aliphatic diols and another component which is a copolyester of 2,2-bis-(4-hydroxyphenyl)-propane and terephthalic acid and isophthalic acid, the ratio of terephthalate residues to isophthalate residues in the co-polyester ranging from 90:10 to 10:90.

The latter component is present in an amount from 50% to 95% by weight of the two polyesters in the blend, preferably 60% to 80%.

The object of the French Patent is to provide an easily moldable polymer blend from two kinds of polyesters, each of which has been considered not suitable for use as a molding.

In the above French patent, the disclosure is that poly(ethylene terephthalate) for example, can be injection molded, but due to the high crystallinity of the material, the resulting articles are very brittle and consequently of no practical value, and that the co-polyesters of 2,2-bis(4-hydroxyphenyl)-propane on the one hand and terephthalic acid and isophthalic acid on the other hand can also be processed using injection molding machines and extruders, but because of the high processing temperatures required very special care must be taken to prevent decomposition, i.e. thermal decomposition, of the polymer during processing.

A co-polyester prepared from 2,2-bis(4-hydroxyphenyl)propane and terephthalic acid-isophthalic acid has excellent properties and is useful in many fields. Unfortunately, products produced from the aromatic co-polyester, especially molded articles, show crazing when left in the air for a long period of time or especially when left in hot water or steam.

The above French Patent does not teach or suggest a means for preventing the crazing of co-polyesters as in the present invention by adding poly(ethylene terephthalate) to the bisphenol-terephthalate-bisphenol-isophthalate co-polyesters of the present invention.

This clearly indicates that the invention disclosed in the above French reference radically differs from the present invention which employs poly(ethylene terephthalate) in a relatively small amount to reduced the crazing of the copolyesters.

SUMMARY OF THE INVENTION

It is an object of this invention to improve the crazing of articles made from aromatic co-polyesters.

It is another object of this invention to provide aromatic co-polyester compositions which can be used as molded articles, mono-filaments, films and the like.

Other objects of this invention will become apparent as the description of the invention proceeds.

The aromatic co-polyesters of this invention are prepared from at least one bishydroxyphenyl compound, i.e., a bisphenol, selected from the group consisting of the bishydroxyphenyl compounds of the general formula

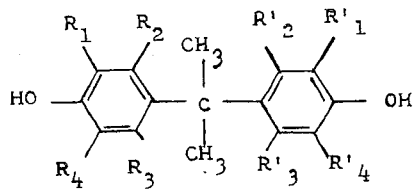

and its functional derivatives as hereafter defined, in which $R_1$, $R_2$, $R_3$, $R_4$, $R'_1$, $R'_2$, $R'_3$ and $R'_4$, which can be the same or different, are members selected from the group consisting of hydrogen, chlorine and bromine. As the acid component which is reacted with the bisphenol to prepare the aromatic co-polyesters of this invention, a mixture of from about 90 to 10 mol% of terephthalic acid or its functional derivatives and from about 10 to 90 mol% of isophthalic acid or its functional derivatives, as hereafter defined, are used.

In general, aromatic co-polyesters prepared from bisphenols or functional derivatives thereof and a terephthalic acid-isophthalic acid mixture or a mixture of the functional derivatives thereof, i.e. bisphenol terephthalate-bisphenol isophthalate co-polyesters, have excellent mechanical properties such as tensile strength, tensile impact strength, bending strength, bending recovery or impact strength, excellent thermal properties such as deflection temperature under load or degradation temperature, excellent electrical properties such as resistivity, electric breakdown endurance, arc resistance, dielectric constant or dielectric loss and low flammability, good dimensional stability and the like.

These aromatic co-polyesters are thus useful in many fields. The aromatic co-polyesters find special use as plastics for injection molding, extrusion molding, press molding and the like, as monofilaments, films and coatings.

The aromatic co-polyesters have excellent characteristics in the various fields mentioned above, but unfortunately, products from these aromatic co-polyesters, especially molded plastics, show "crazing" when left in the air for a long period of time or especially when left in hot water or steam. The term "crazing" means the phenomena that molded products become cloudy, partially or wholly, with a fine crack-like pattern being generated on the surface or in the interior of the products. "Crazing" not only reduces the transparency of the products, which is one of the characteristics of the aromatic co-polyesters, but reduces the toughness of the products, so that, for example, the tensile impact strength of the molded products is markedly reduced, and the bending strength, modulus of bending and recovery ratio after bending also is reduced, as a result, with such a bending strength the products approach breaking.

We have now found that the incorporation of poly-(ethylene terephthalate), as hereafter defined, into the aromatic copolyester prior to the molding of the aromatic co-polyester improves these disadvantages, i.e., according to the present invention "crazing" can be effectively prevented, while the original merits of the aromatic co-polyesters are substantially maintained.

DETAILED DESCRIPTION OF THE INVENTION

The aromatic co-polyesters of this invention are resins prepared from at least one bisphenol selected from the group consisting of the bisphenols of the general formula

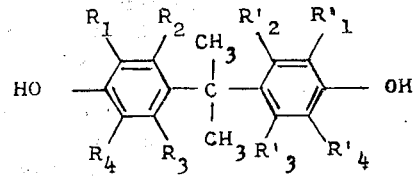

and their functional derivatives, in which $R_1$, $R_2$, $R_3$, $R_4$, $R'_1$, $R'_2$, $R'_3$, and $R'_4$, which can be the same or different, are members selected from the group consisting of hydrogen, chlorine and bromine. Typical functional derivatives of the bisphenols are the metal salts and the di-esters with aliphatic mono-carboxylic acids having 1 to 3 carbon atoms. More preferable functional derivatives of the bisphenols are sodium salts, potassium salts or diacetate esters. Examples of bisphenols used in this invention are 2,2-bis(4-hydroxyphenyl)propane, 2,2-bis(4-hydroxy-3-chlorophenyl)propane, 2,2-bis(4-hydroxy-3,5-dichlorophenyl)propane, 2,2-bis(4-hydroxy-3-bromophenyl)propane and 2,2-bis(4-hydroxy-3,5-dibromophenyl)-propane. Especially, 2,2-bis(4-hydroxyphenyl)propane is most preferably used. Mixtures of such bisphenols can also be used.

As the acid component which is reacted with the bisphenol to prepare the aromatic co-polyester of this invention, a mixture of from about 90 to 10 mol% of terephthalic acid or a functional derivative thereof and from about 10 to 90 mol% of isophthalic acid or a functional derivative thereof is used. More preferably, a mixture of from 30 to 70 mol% of terephthalic acid or a functional derivative thereof and from 70 to 30 mol% of isophthalic acid or a functional derivative thereof is employed. An aromatic co-polyester prepared from a bisphenol and a mixture of 50 mol% of terephthalic acid or a functional derivative thereof and 50 mol% of isophthalic acid or a functional derivative thereof is most preferred as a standard grade aromatic co-polyester.

As functional derivatives of terephthalic or isophthalic acid, acid-halides such as terephthaloyl or isophthaloyl di-chloride and terephthaloyl or isophthaloyl dibromide, and di-esters such as the di-alkyl esters or the di-aryl esters, having from 1 to 6 carbon atoms, are most preferred. Typical examples thereof are diphenyl terephthalate and diphenyl isophthalate.

The aromatic co-polyesters of this invention can be represented by the formula:

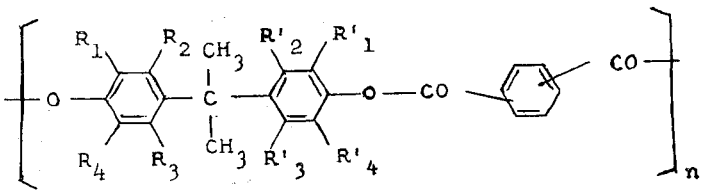

wherein $R_1$, $R_2$, $R_3$, $R_4$, $R'_1$, $R'_2$, $R'_3$, and $R'_4$ are as heretofore defined and $n$ is an integer, the aromatic co-polyesters preferably having a logarithmic viscosity of about 0.3 to 1.0, as hereafter defined.

The aromatic co-polyesters of this invention can be prepared by several methods, e.g., an interfacial polycondensation process can be used. In this case an aqueous alkaline solution of a bisphenol and a terephthaloyl dihalide-isophthaloyl dihalide mixture dissolved in an organic solvent which is immiscible with water are mixed and reacted. Interfacial polycondensation processes which can be used are disclosed, for example, in W. M. Eareckson *J. Polymer Sci.*, XL 399 (1959), and Japanese patent publication No. 1959/65.

The following is a typical polycondensation process. An aqueous alkali solution of a bisphenol is added to a terephthaloyl dihalide-isophthaloyl dihalide mixture, more preferably a terephthaloyl dichloride-isophthaloyl dichloride mixture, dissolved in an organic solvent, or an organic solvent solution of a terephthaloyl dihalide-isophthaloyl dihalide mixture is added to an aqueous alkaline solution of a bisphenol. Alternatively, an aqueous alkaline solution of a bisphenol and an organic solvent solution of a terephthaloyl dihalide-isophthaloyl dihalide mixture can be simultaneously added to a reaction vessel. Interfacial polycondensation takes place near the interface of the aqueous phase and the orgainc phase. However, since the aqueous phase and the organic phase are not essentially miscible, it is necessary to mutually disperse the phases. For this purpose an agitater or a mixer such as Homo-mixer can be used.

The concentration of the terephthaloyl dihalide-isophthaloyl dihalide mixture dissolved in the organic solvent is usually from about 2 to 25 weight %, more preferably from 3 to 15 weight %. The concentration of the bisphenol in the aqueous alkaline solution is also usually from about 2 to 25 weight %, more preferably from 3 to 15 weight %.

The amount of the bisphenol and of the terephthaloyl dihalide-isophthaloyl dihalide mixture used (molar ratio) is preferably maintained equivalent. An excess of the terephthaloyl dihalide-isophthaloyl dihalide mixture is not desirable in the preparation of the high molecular weight aromatic co-polyester.

Preferred alkalis are sodium hydroxide and potassium hydroxide. The concentration of the alkali in the aqueous solution can vary widely depending upon the reaction conditions, but is usually in the range from about 0.5 to 10 weight %. It is advantageous if the quantity of alkali is nearly equivalent to the hydroxy groups of the bisphenol used or present in slight excess. The preferred molar ratio of alkali to the hydroxy group of a bisphenol is from about 1:1 to 1:2, most preferably from 1:1 to 1:1.1.

As organic solvents dissolving the terephthaloyl dihalide-isophthaloyl dihalide mixture, hydrocarbons or halogenated hydrocarbons are used. For example, methylene dichloride, chloroform, tetrachloromethane, 1,2-dichloroethane, 1,1,2-trichloroethane, tetrachloroethane, benzene and methylbenzene can be employed. Especially, preferred are those which also dissolve the aromatic co-polyesters produced. The most preferred solvent is methylene dichloride.

The reaction temperature is not strictly limited, but usually preferably below about 40°C, with from 5° to 30°C being especially preferred.

Interfacial polymerization is usually conducted at normal pressure and is completed in about 1 - 2 hours.

Antioxidants, dispersing agents, catalysts and viscosity stabilizers can be added to the aqueous alkaline solution or to the reaction mixture, if desired. Typical examples of such agents are as follows. As antioxidants, sodium hydrosulfite or sodium bisulfite can be used. As dispersing agents, anionic surface-active agents such as sodium lauryl sulfate and octadecyl benzene sulfonate, cationic surface-active agents such as cetyl trimethyl ammonium chloride, and nonionic surface-active agents such as poly(ethylene oxide) can be used. As catalysts, quaternary ammonium compounds such as trimethyl benzyl ammonium hydroxide, trimethyl benzyl ammonium chloride and triethyl benzyl ammonium chloride, tertiary sulfonium compounds such as dimethyl-2-hydroxyphenyl sulfonium chloride, quaternary phosphonium compounds such as triphenyl methyl phosphonium iodide and quaternary arsonium compounds such as triphenyl methyl arsonium iodide and trimethyl octyl arsonium iodide can be used. Tertiary amine compounds such as trimethyl amine, triethyl amine and benzyl dimethyl amine can also be used as catalysts. As a viscosity stabilizer, mono-valent compounds, especially mono-valent phenol compounds such as o-phenyl phenol, p-phenyl phenol, m-cresol, tert-butylamine and β-naphthol can be used, if desired.

Another useful method for forming the aromatic co-polyesters is melt polymerization, as disclosed, for example, in A. Conix, *Ind. Eng. Chem.*, 51 147 (1959) in Japanese patent publication 15,247/63 and in U.S. Pat. No. 3,395,119.

Melt polymerization can be conducted, for example, by heating and reacting an aliphatic carbocyclic acid diester of a bisphenol and a terephthalic acid-isophthalic acid mixture at reduced pressure. A preferred diester of a bisphenol is the diacetate. Melt polymerization can also be conducted by heating and reacting a bisphenol and a mixture of a diaryl ester of terephthalic acid and isophthalic acid. A typical diaryl ester is the diphenyl ester. The reaction temperature employed is in the range of from about 150° to 350°C, more preferably from 180° to 320°C. The reaction pressure is usually varied in the course of the reaction from atomospheric pressure at the early part of the reaction to reduced pressure, such as below about 0.02 mmHg, as the end of the reaction.

In melt polymerization, the molar ratio of the bisphenol and the mixture of terephthalic acid-isophthalic acid components to prepare a high molecular weight aromatic co-polyester must be maintained exactly equivalent.

A number of catalysts can be used. Catalysts which are preferably used are titanium compounds, such as butyl orthotitanate and titanium dioxide. Other catalysts such as zinc oxide, lead oxide and antimony dioxide can also be used.

Still another method for forming the co-polyesters is solution polymerization, in which the aromatic co-polyesters are prepared by reacting a bisphenol with terephthaloyl dihalide and isophthaloyl dihalide in an organic solvent. Solution polymerizations as can be used are disclosed, for example, in A. Conix, *Ind. Eng. Chem.*, 51 147 (1959), and in U.S. Pat. No. 3,133,898.

The solution polymerization, the bisphenol and the mixture of terephthaloyl dihalide and isophthaloyl dihalide, e.g., terephthaloyl dichloride and isophthaloyl dichloride, are usually mixed in equimolar proportions in an organic solvent, and the mixture is warmed gradually to high temperatures such as about 220°C. As the organic solvent used, those which also dissolve the aromatic co-polyesters produced, such as dichloroethyl benzene, are preferred. Usually, the reaction is carried out in the presence of a base to neutralize the hydrogen halide, e.g., hydrogen chloride, formed.

In order to insure good physical properties for the aromatic co-polyesters in this invention, the aromatic co-polyesters should have a logarithmic viscosity of from about 0.3 to 1.0, more preferably from 0.4 to 0.8. The logarithmic viscosity ($\eta$ inh) is defined by the relationship $$\eta \text{ inh} = \frac{\log_e t_1/t_2}{C}$$

wherein $t_1$ is the falling time (seconds) of the polymer solution; $t_2$ is the falling time (seconds) of the solvent; and $C$ is the concentration (g/dl) of the polymer in the solution. Logarithmic viscosity in this invention is determined in a 1,1,2,2-tetrachloroethane-phenol mixture (weight ratio: 4/6) at 25°C.

Poly(ethylene terephthalate) as is employed in this invention can be prepared by any known method. Preferably the poly(ethylene terephthalate) used in this invention has an intrinsic viscosity ($[\eta]$) of from about 0.3 to 1.3, more preferably from 0.5 to 1.1. The intrinsic viscosity is defined by the relationship $$[\eta] = \lim_{C \to 0} \frac{t_1/t_2 - 1}{C}$$

wherein $t_1$ is the falling time (seconds) of the polymer solution; $t_2$ is the falling time (seconds) of the solvent; and $C$ is the concentration (g/dl) of the polymer in the solution. Intrinsic viscosity is determined in a 1,1,2,2-tetrachloroethane-phenol mixture (weight ratio: 4/6) at 25°C.

The quantity of the poly(ethylene terephthalate) added to the aromatic co-polyester in this invention should be within the range of from 0.1 to 4% of the sum of the weight of the aromatic co-polyester and the poly(ethylene terephthalate).

Using poly(ethylene terephthalate) in an amount of from 0.1 to 4 weight %, even at such small amounts "crazing" is effectively prevented and other properties and advantages of the aromatic co-polyester are fully maintained.

It is surprising that crazing of the aromatic co-polyester in this invention could be so substantially improved by the incorporation of such a small amount of poly(ethylene terephthalate).

The crazing preventing effect of aromatic co-polyester by the addition of poly(ethylene terephthalate)

increases with increasing amounts thereof within the range according to the present invention. Where the amount of poly(ethylene terephthalate) added reaches 4 weight %, the maximum crazing preventing effect is achieved, and even though an amount of poly(ethylene terephthalate) in excess of the above set forth range is added, the crazing preventing effect does not increase. On the other hand, aromatic co-polyester possesses excellent various properties as described before, but the addition of poly(ethylene terephthalate) in a large amount invites a reduction in the various properties. For example, inflammability is one of the important characteristics of the aromatic copolyester, but the addition of poly(ethylene terephthalate) in an increased amount remarkably reduces this characteristic.

Where the amount of poly(ethylene terephthalate) added is not more than 4 weight % as in the present invention, the inflammability which is inherently present in the aromatic co-polyester is substantially not affected. However, exceeding this amount remarkably reduces the inflammability which is an inherent property of the aromatic co-polyester.

As a measurement for the crazing preventing effect, the tensile impact maintenace ratio and the recovery ratio after bending of aromatic co-polyester molded product after crazing treatment (immersion in water at 80°C for 5 days) are used, and the tensile strength maintenance ratio, recovery ratio after bending and inflammability resulting from the addition of poly(ethylene terephthalate) are shown in Table 1 below.

120 l of an aqueous solution containing 5.51 Kg of 2,2-bis(4-hydroxyphenyl)propane, 184.7 g of o-phenyl phenol, 2.13 kg of sodium hydroxide, 27.5 g of sodium hydrosulfite and 45 ml of an aqueous solution of trimethyl benzyl ammonium chloride [containing 0.5 weight % of trimethyl benzyl ammonium chloride to 2,2-bis(4-hydroxy phenyl)propane] was prepared and maintained at 14°C. 60 l of a methylene dichloride solution containing 2.45 kg of terephthaloyl dichloride and 2.45 Kg. of isophthaloyl dichloride was prepared and also maintained at 14°C. Both solutions were simultaneously poured into a 200 l glass-lined vessel equipped with a stirrer over a 60 second period. The mixture was stirred and the temperature maintained at 20°C. After 2 hours of reaction, the methylene dichloride phase was separated by centrifugal separation. The resulting methylene dichloride solution was washed three times by vigorously stirring it with an equal volume of water, and the solution was then filtered. The aromatic co-polyester was separated by evaporation of the methylene dichloride from the solution using a kneader at about 40°C. The separated aromatic co-polyester was then washed with hot water at 80°C to remove occluded methylene dichloride and dried at 120° C. The logarithmic viscosity of the aromatic co-polyester was 0.60, determined as earlier described.

The poly(ethylene terephthalate) in Table 1, was prepared by Nippon Ester Co. Ltd., and the intrinsic viscosity thereof was 0.51, determined as earlier described.

Table 1

Properties of Various Aromatic Co-polyester/Poly (ethylene terephthalate) Systems

| Evaluation | | Composition (aromatic co-polyester/poly(ethylene terephthalate)) | | | | | | | |
|---|---|---|---|---|---|---|---|---|---|
| | | 100/0 | 99.9/0.1 | 99/1 | 98/2 | 97/3 | 96/4 | 95/5 | 90/10 |
| Tensile Impact[1] Strength Maintenance Ratio (%) | | 15 | 75 | 80 | 87 | 90 | 93 | 90 | 90 |
| Recovery Ratio[2] After Bending (%) | | Broken | 98 | 98 | 98 | 99 | 99 | 97 | 97 |
| Inflammability[3]: | 1/4" | Corrs.to 94V-O | Corrs.to 94V-O | Corrs.to 94V-O | Corrs.to 94V-O | Corrs.to 94V-O | Corrs.to 94V-O | Corrs.to 94V-I | Corrs.to 94V-II |
| | 1/8" | Corrs.to 94V-O | Corrs.to 94V-O | Corrs.to 94V-O | Corrs.to 94V-O | Corrs.to 94V-O | Corrs.to 94V-O | Corrs.to 94V-II | Corrs.to 94 HB |
| | 1/16" | Corrs.to 94V-I | Corrs.to 94V-I | Corrs.to 94V-I | Corrs.to 94V-I | Corrs.to 94V-I | Corrs.to 94V-I | Corrs.to 94V-II | Corrs.to 94 HB |

[1]Tensile Impact Strength Maintenance Ratio (%) = $\frac{\text{Tensile Impact Strength after Crazing Treatment}}{\text{Tensile Impact Strength before Crazing Treatment}} \times 100$ Tensile Impact Strength : ASTM D-1822-68 Type S
[2]Test conditions: γ = 0.08, 10 times bending, after 24 hrs.
Test piece is according to ASTM D-790-66
$130^L \times 13^W \times 6.4^{T(mm)}$
[3]According to Underwriters Laboratory, Subject E-764

One of the reasons that aromatic co-polyester is being watched with keenest interest in various field is the inflammability property. Loss of this property is not desirable to. In the present invention it has now been found that crazing can be effectively prevented without reducing the inherent properties of aromatic co-polyester by limiting the amount of poly(ethylene terephthalate) to 0.1 to 4 weight %.

The aromatic co-polyester in Table 1 was prepared by interfacial polycondensation using 2,2-bis(4-hydroxyphenyl)propane and a terephthaloyl dichloride-isophthaloyl dichloride mixture (molar ratio of terephthaloyl dichloride and isophthaloyl dichloride 1/1) as follows.

To add poly(ethylene terephthalate) to the aromatic copolyesters of this invention, any well known mixing technique can be used. For example, grains or powders of these two components can be mixed and blended with a V-blender, Henschel mixer, Super mixer or Kneader, and then the mixture immediately molded. Alternatively, the mixture can be formed into pellets after melting with an extruder, a co-kneader, an intensive mixer or the like, and then molded. The pelletizing or molding temperature is generally in the range of from about 250° to 350°C, more preferably 260° to 320°C.

Another addition method comprises adding the poly(ethylene terephthalate) to a solution of the aromatic co-polyester and then evaporating off the solvent. As the solvent, those which dissolve the aromatic co-polyester can be used, such as methylene dichloride, tetrachloroethane and chloroform. The most preferred solvent is methylene dichloride.

The most suitable method for any particular system can be chosen according to the composition and the desired shape and properties of the molded articles to be produced therefrom.

In order to improve the heat resistance, light stability, weatherability or oxidation resistance of the composition or articles produced according to this invention, agents preventing thermal degradation, antioxidants, ultraviolet absorbants and the like can be added thereto, if desired. For example, benzotriazole, aminophenyl benzotriazole, benzophenone, trialkyl phosphates, such as trioctyl phosphate and tributyl phosphate, trialkyl phosphites, such as trioctyl phosphite, and triaryl phosphites such as triphenyl phosphite, can be used. These materials are conveniently added to the aromatic co-polyester containing poly(ethylene terephthalate) of this invention at any time prior to molding. Known plasticizers, such as phthalate esters, e.g., dioctyl terephthalate and dioctyl isophthalate, and colorants, such as carbon black and titanium dioxide, may also be added if desired, in commonly used amounts as are known in this art.

The aromatic co-polyesters containing poly(ethylene terephthalate) of this invention can be used to form many useful articles using generally known molding methods such as injection molding, extrusion molding, press molding and the like. Typical examples of final products produced therefrom are films, monofilaments, injection molded materials such as machine parts, automobile parts, electrical parts, vessels and springs. The aromatic co-polyesters containing poly(ethylene terephthalate) of this invention find special use as engineering plastics for various uses which require good properties.

The invention will now be further illustrated by the following examples, in which all parts are by weight unless otherwise stated. This invention is not, however, to be construed as being limited to the examples.

EXAMPLE 1

An aromatic co-polyester was prepared by interfacial polycondensation as follows.

To a 200 l stainless vessel equipped with a stirrer, about 100 l of an aqueous alkaline solution which contained 2.04 Kg of sodium hydroxide, 5.51 Kg of 2,2-bis(4-hydroxy phenyl)propane, 27.5 g of sodium hydrosulfite and 45 ml of an aqueous solution of trimethyl benzyl ammonium chloride, which contained 0.5 weight % of trimethyl benzyl ammonium chloride to 2,2-bis(4-hydroxy phenyl)propane, were added, and the system dissolved while stirring and bubbling nitrogen gas through the mixture. To the resulting solution, an aqueous solution in which 102.6 g of o-phenyl phenol and 47.2 g of sodium hydroxide were dissolved was added. While the mixed solution was maintained at 14°C, the total volume of the solution was adjusted to 120 l by adding further water.

On the other hand, 2.45 Kg of terephthaloyl dichloride and 2.45 Kg of isophthaloyl dichloride were dissolved in methylene dichloride in a 150 l glass lined vessel equipped with a stirrer. The mixture was maintained at 14°C and the total volume of the solution was adjusted to 60 l by adding further methylene dichloride. The molar ratio of terephthaloyl dichloride and isophthaloyl dichloride was 1/1.

Both solutions were simultaneously poured into a 200 l glass-lined vessel equipped with a stirrer over a 60 second. The mixture was stirred vigorously at 20°C under atmospheric pressure for 2 hours. The methylene dichloride phase was separated by centrifugal separation. 60 l of water was then added to the methylene dichloride phase, and then acetic acid was added and the pH of the mixture maintained at 4. After 20 minutes of stirring, the methylene dichloride phase separated and was washed twice with 60 l of water. The methylene dichloride solution, after filtration, was placed in a 100 l kneader and the aromatic co-polyester separated from the solution while kneading vigorously and evaporating off methylene dichloride at 40° to 80°C. The aromatic co-polyester separated was washed with hot water at 80°C for 30 minutes to remove occluded methylene dichloride, and then dried at 120°C. The logarithmic viscosity of the aromatic co-polyester was 0.65.

97 parts of this aromatic co-polyester and 3 parts of poly(ethylene terephthalate) powder (made by Nippon Ester Co. Ltd., [$\eta$] = 0.64) were mixed for 2 hours with a V-blender.

The resulting mixed powder was then dried to a water content below 0.02 weight % at 120°C, and extruded using an extruder (40 m/m$\phi$, L/D = 18) at 300°C and pelletized.

ASTM test pieces (see Table 2) were injection molded from the pellets prepared as above. The molding temperature was 300°C, the injection pressure was 1230 Kg/cm$^2$ and the mold temperature was 100°C. The molded product had clear surfaces and were transparent.

For comparison, an aromatic co-polyester free of poly (ethylene terephthalate) was injection molded into the same type test pieces. The molding temperature was 320°C, the injection pressure was 1300 Kg/cm$^2$ and the mold temperature was 120°C.

After leaving all test pieces at 80°C, 95% relative humidity for 20 days, i.e. crazing treatment, serious crazing was observed in the molding pieces of the aromatic co-polyester free of poly(ethylene terephthalate). On the contrary, no crazing was observed in the test pieces containing 3 parts of poly(ethylene terephthalate).

Several mechanical property tests were performed on these test pieces before and after the crazing treatment described above. (See Table 2.)

Almost all of the test pieces from the aromatic co-polyester free of poly(ethylene terephthalate) broke during testing or showed reduced machanical properties after the crazing treatment, but the test pieces which were prepared according to this invention kept their excellent properties after the crazing treatment.

Table 2

Mechanical Properties of the Aromatic Co-polyester

| | Sample | | | |
|---|---|---|---|---|
| | Example 1 | | | |
| | Aromatic Co-polyester Containing 3 Parts of Poly(ethylene terephthalate) | | Aromatic Co-polyester Free of Poly(ethylene terephthalate) | |
| Evaluation | Untreated[1] | Treated | Untreated[1] | Treated |
| Tensile Strength[2] (Kg/cm$^2$) | 750 | 745 | 730 | 600 |
| Bending Strength[3] (Kg/cm$^2$) | 790 | 780 | 740 | Broken |
| Modulus of Bending[3] (Kg/cm$^2$) | 19200 | 19100 | 18400 | Broken |
| Recovery Ratio after Bending (%) | 100 | 99 | 100 | Broken |
| Impact Strength[4] (Kg.cm/cm) | 8.9 | 8.8 | 8.7 | 3.6 |
| Tensile Impact Strength[5] (Kg.cm/cm$^2$) | 430 | 380 | 400 | 50 |

[1] Not subjected to crazing treatment
[2] ASTM D-638-64T Type-I Thickness 3.2 mm
[3] ASTM D-790-66 130$^L$ × 13$^W$ × 6.4$^T$ (mm) = 0.05
[4] ASTM D-256-56 63.5$^L$ × 12.7$^W$ × 12.7$^T$ (mm) Notch: 45°, 2.5 mm deep., 0.245 mm rad.
[5] ASTM D-1822-68 Type S

EXAMPLE 2

Aromatic co-polyester pellets containing poly(ethylene terephthalate) were prepared as in Example 1 except for using 99 parts of the aromatic co-polyester powder as in Example 1 and 1 part of poly(ethylene terephthalate) powder. From these pellets ASTM dumbbell test pieces (ASTM D-638-64T, Type-I, Thickness 3.2 mm) were injection molded. The molding temperature was 310°C, the mold temperature was 110°C and the injection pressure was 1200 Kg/cm$^2$. A crazing treatment for the dumbbell test pieces was carried out as in Example 1. Crazing was not observed.

The mechanical properties, of the dumbbell test pieces after the crazing treatment, were essentially equal to those before the crazing treatment (See Table 3).

Table 3

Mechanical Properties of the Aromatic Co-polyester

| | Aromatic Co-polyester Containing 1 Part of Poly (ethylene terephthalate) | |
|---|---|---|
| Evaluation | Untreated[1] | Treated |
| Tensile Strength[2] (Kg/cm$^2$) | 740 | 735 |
| Bending Strength[3] (Kg/cm$^2$) | 750 | 730 |
| Modulus of Bending[3] (Kg/cm$^2$) | 18700 | 18500 |
| Recovery Ratio after Bending (%) | 100 | 100 |
| Impact Strength[4] (Kg/cm/cm) | 8.7 | 8.7 |
| Tensile Impact[5] Strength (Kg.cm/cm$^2$) | 405 | 320 |

[1] Not subjected to crazing treatment
[2] ASTM D-638-64T Type-I Thickness 3.2mm
[3] ASTM D-790-66 130$^L$ × 13$^W$ × 6.4$^T$ (mm) y=0.05
[4] ASTM D-256-56 63.5$^L$ × 12.7$^W$ × 12.7$^T$ (mm) Notch; 45°, 2.5mm deep, 0.245 rad.
[5] ASTM D-1822-68 Type S

EXAMPLE 3

An aromatic co-polyester was prepared by interfacial polycondensation as in Example 1, except for using 3.43 Kg of terephthaloyl dichloride and 1.47 Kg of isophthaloyl dichloride, the molar ratio of terephthaloyl dichloride and isophthaloyl dichloride being 7/3. The aromatic co-polyester had a logarithmic viscosity of 0.68.

The aromatic co-polyester obtained was dissolved in methylene dichloride, the concentration of the aromatic co-polyester being about 10 weight %. To this aromatic co-polyester solution 20-mesh poly(ethylene terephthalate) powder (made by Nippon Ester Co. Ltd., [η] = 0.69) was added to provide a slurry. The weight ratio of the aromatic co-polyester and poly(ethylene terephthalate) was 96/4. With vigrous stirring, acetone of twice the volume of the methylene dichloride solution was added to the slurry and the aromatic co-polyester containing poly(ethylene terephthalate) was precipitated as a powder. The precipitated polymer was washed with hot water and dried to a water content of below 0.02 weight %. Using the powder, ASTM test pieces were injection molded, the molding temperature being 300°C, the injection pressure being 1160Kg/cm$^2$, and the mold temperature being 110°C. The resulting test pieces were tested by immersion in hot water at 80°C for 5 days. Crazing was not observed. Several properties of the test pieces either before or after the crazing treatment described above are given in Table 3, as compared to samples free of poly (ethylene terephthalate). Further, no deterioration of the inflammability of the aromatic co-polyester by the addition of poly(ethylene terephthalate) was observed at all.

Table 4

Properties of the Aromatic Co-polyester Sample

| Evaluation | Example 3 Aromatic Co-polyester Containing 4 Parts of Poly(ethylene terephthalate) Untreated[1] | | Aromatic Co-polyester (same as Example 3 but free of poly(ethylene terephthalate)) Untreated[1] | |
|---|---|---|---|---|
| | | Treated | | Treated |
| Tensile Strength[2] (Kg/cm²) | 745 | 739 | 750 | 600 |
| Bending Strength[3] (Kg/cm²) | 780 | 775 | 750 | Broken |
| Modulus of Bending[3] (Kg/cm²) | 19400 | 19200 | 19300 | Broken |
| Recovery Ratio after Bending (%) | 100 | 98 | 100 | Broken |
| Impact Strength[4] (Kg.cm/cm) | 8.9 | 8.7 | 8.7 | 5.0 |
| Retention of Impact Strength (%) | — | 98 | — | 58 |
| Tensile Impact Strength[5](Kg.cm/cm²) | 435 | 395 | 430 | 45 |
| Retention of Tensile Impact Strength (%) | — | 91 | — | 10 |
| Inflammability[6] 1/4 " | Corrs. to 94 V-O | | Corrs. to 94 V-O | |
| 1/8 " | Corrs. to 94 V-O | | Corrs. to 94 V-O | |
| 1/16 " | Corrs. to 94 V-1 | | Corrs. to 94 V-1 | |

[1]Not subjected to crazing treatment
[2]ASTM D-638-64T Type-I Thickness 3.2 mm
[3]ASTM D-790-66 130$^L$ × 13$^W$ × 6.4$^T$ (mm) γ = 0.05
[4]ASTM D-256-56 63.5$^L$ × 12.7$^W$ × 12.7$^T$(mm), Notch 45°, 2.5 mm deep, 0.245 mm rad.
[5]ASTM D-1822-68 Type S
[6]According to Under Writers Laboratory, Subject e-764

EXAMPLE 4

An aromatic co-polyester was prepared by interfacial polycondensation as described in Example 1, except for using 1.47 Kg of terephthaloyl dichloride and 3.43 Kg of isophthaloyl dichloride, the molar ratio of terephthaloyl dichloride and isophthaloyl dichloride being 3/7. The aromatic co-polyester obtained had a logarithmic viscosity of 0.70. Injection molded ASTM test pieces were prepared as described in Example 3 using 3 parts of poly(ethylene terephthalate). They did not craze after being subjected to the crazing treatment as described in Example 3.

Several properties of the test pieces either before or after the crazing treatment described above are given in Table 5.

An aromatic co-polyester where poly(ethylene terephthalate) is added thereto retains the same properties after the treatment as those before the treatment. Further, no deterioration in inflammability by the addition of poly(ethylene terephthalate) was observed.

Table 5

Several Properties of the Aromatic Co-polyester Sample

| Evaluation | Example 4 Aromatic Co-polyester Containing 3 Parts of Poly(ethylene terephthalate) Untreated[1] | | Aromatic Co-polyester (same as Example 4, but free of poly(ethylene terephthalate) Untreated[1] | |
|---|---|---|---|---|
| | | Treated | | Treated |
| Tensile Strength[2] (Kg/cm²) | 725 | 710 | 730 | 570 |
| Bending Strength[3] (Kg/cm²) | 760 | 755 | 725 | broken |
| Modulus of Bending[3] (Kg/cm²) | 19400 | 19200 | 19300 | broken |
| Recovery Ratio after Bending (%) | 100 | 99 | 100 | broken |
| Impact Strength[4] (Kg.cm/cm) | 8.6 | 8.5 | 8.5 | 4.0 |
| Tensile Impact Strength[5] (Kg.cm/cm²) | 420 | 390 | 410 | 30 |
| Inflammability[6] 1/4 " | Corrs. to 94 V-O | | Corrs. to 94 V-O | |
| 1/8 " | Corrs. to 94 V-O | | Corrs. to 94 V-O | |
| 1/16 " | Corrs. to 94 V-1 | | Corrs. to 94 V-1 | |

[1]Not subjected to crazing treatment
[2]ASTM D-638-64T Type-I Thickness 3.2 mm
[3]ASTM D-790-66 130$^L$ × 13$^W$ × 6.4$^T$ (mm) γ =0.05
[4]ASTM D-256-56 63.5$^L$ × 12.7$^W$ × 12.7$^T$ (mm) Notch 45°, 2.5 mm deep, 0.245 mm rad.
[5]ASTM D-1822-68 Type S
[6]According to Under Writers Laboratory, Subject E-764

EXAMPLES 5-6

Aromatic co-polyester powder was prepared by melt polymerization from 2,2-bis(4-hydroxy phenyl)propane and a diphenyl terephthalate-diphenyl isophthalate mixture.

9.54 Kg of diphenyl terephthalate, 6.36 Kg of diphenyl isophthalate, the molar ratio of diphenyl terephthalate and diphenyl isophthalate being 6/4, 11.4 Kg of 2,2-bis(4-hydroxy phenyl) propane and 0.2 Kg of potassium borohydride were placed in a 50 l stainless steel autoclave equipped with a stirrer and a nitrogen inlet tube. The mixture was heated to 200°C under a dry nitrogen flow at atmospheric pressure. After 1 hour, the nitrogen flow was stopped and the pressure reduced to 10 mmHg. The reaction temperature was then gradually increased to 280°C over a 30 minute period, while phenol was continuously bled off from the reaction vessel. 1 hour after the pressure was reduced to 0.2 mmHg the temperature was increased to 300°C. The reaction mixture was maintained at these conditions for 4 hours. The reaction mixture was then purged with dry nitrogen and cooled to room temperature. The polymer was removed and crushed into a powder. The aromatic co-polyester powder prepared was dissolved in 200 l of methylene-dichloride and filtered, and then 200 l of acetone was poured into the polymer solution. The precipitated aromatic co-polyester was separated and washed with water, then dried at 120°C for 20 hours.

The logarithmic viscosity of the aromatic co-polyester powder prepared was 0.63.

The aromatic co-polyester powder and poly(ethylene terephthalate) (made by Nippon Ester Co. Ltd., [η] = 0.64) were added to a vessel. The mixture was stirred at 290°C, while passing dry nitrogen gas therethrough for 10 minutes. The resulting melt was pelletized. The ASTM test pieces were injection molded from these pellets as in Example 1.

The crazing treatment was conducted in the same manner as in Example 1, and the changes in the various properties before or after treatment are shown in Table 6 below. The aromatic co-polyester wherein poly(ethylene terephthalate) is added retains the original properties after treatment, but the properties of the aromatic co-polyester where no poly(ethylene terephthalate) was added were reduced after the treatment. Further, no deterioration in inflammability upon adding the poly(ethylene terephthalate) was observed.

in Example 7, except 1.31 Kg of 2,2-bis(4-hydroxy-3,5-dibromo phenyl)propane was used instead of 0.88 Kg of 2,2-bis(4-hydroxy-3,5-dichloro phenyl)propane. The molar ratio of 2,2-bis(4-hydroxy phenyl)propane Table 6

Several Properties and Inflammability of the Aromatic Co-polyester Containing Poly(ethylene terephthalate) and Free of Poly(ethylene terephthalate)

| Example | Composition (Aromatic co-polyester/poly(ethylene terephthalate) | Tensile[1] Strength (Kg/cm$^2$) | Tensile-Impact[2] Strength (Kg.cm/cm$^2$) × 10 | Bending[3] Strength (Kg/cm$^2$) | Inflammability[4] 1/4 " | 1/8 " | 1/16 " |
|---|---|---|---|---|---|---|---|
| 5 | 98/2 | | | | | | |
| | Untreated | 705 | 42.0 | 768 | Corrs. to 94 -V0 | Corrs. to 94 V-0 | Corrs. to 94 V-1 |
| | Treated | 700 | 36.0 | 765 | | | |
| 6 | 96/4 | | | | | | |
| | Untreated | 705 | 43.0 | 770 | Corrs. to 94-V-0 | corrs. to 94 V-0 | Corrs. to 94 V-1 |
| | Treated | 700 | 38.0 | 765 | | | |
| Aromatic co-polyester | 100/0 | | | | | | |
| | Untreated | 710 | 41.5 | 765 | Corrs. to 94 V-0 | Corrs. to 94 V-0 | Corrs. to 94 V-1 |
| | Treated | 590 | 5.5 | broken | | | |

[1]ASTM D-638-64T Type 1 Thickness 3.2 mm
[2]ASTM D-1822-68 Type S
[3]ASTM D-790-66 130$^L$ × 13$^W$ × 6.4 $^T$(mm) γ=0.05
[4]According to Underwriters Laboratory, Subject E-764

EXAMPLE 7

An aromatic co-polyester in which the content of 2,2-bis-(4-hydroxy-3,5-dichloro phenyl)propane was 10 mol% of the sum of the bisphenol units was prepared. The starting materials and amounts were as follows: 120 l of an aqueous alkaline solution which contained 4.97 Kg of 2,2-bis(4-hydroxyphenyl)propane, 0.88 Kg of 2,2-bis(4-hydroxy-3,5-dichlorophenyl)propane, 2.09 Kg of sodium hydroxide, 27.5 g of sodium hydrosulfite, 45 ml of trimethyl benzyl ammonium chloride and 102.6 g of o-phenyl phenol, and 60 l of a methylene dichloride solution which contained 2.45 Kg of terephthaloyl dichloride and 2.45 Kg of isophthaloyl dichloride. The molar ratio of 2,2-bis(4-hydroxyphenyl)propane and 2,2-bis (4-hydroxy-3,5-dichlorophenyl)propane was 9/1, and the molar ratio of terephthaloyl dichloride and isophthaloyl dichloride was 1/1.

The process for the preparation of the aromatic co-polyester was the same as was used in Example 1, except that the reaction time was 3 hours.

The logarithmic viscosity of the aromatic co-polyester was 0.61.

97 Parts of this aromatic co-polyester and 3 parts of poly(ethylene terephthalate) powder (made by Nippon Ester Co. Ltd.,[η] = 0.64) were mixed, pelletized and injection molded as in Example 1.

Crazing was not observed after the crazing treatment as in Example 1 or in Example 3.

The tensile impact strength maintenance ratio of the aromatic co-polyester after the crazing treatment where poly(ethylene terephthalate) was added was 92%, and this is excellent in comparison with a ratio of 13% of where no poly(ethylene terephthalate) was added. Further, the inflammability corresponded to 94V-O in a thickness of ¼ inch, ⅛ inch and 1/16 inch where either poly(ethylene terephthalate) was added or not added, and no deterioration in inflammability by the addition of poly(ethylene terephthalate) was observed.

EXAMPLE 8

An aromatic co-polyester which contained 2,2-bis(4-hydroxy-3,5-dibromo phenyl)propane was prepared as and 2,2-bis(4-hydroxy-3,5-dibromo phenyl)propane was 9/1, and the molar ratio of terephthaloyl dichloride and isophthaloyl dichloride was 1/1.

The logarithmic viscosity of the aromatic co-polyester was 0.58.

97 parts of this aromatic co-polyester and 3 parts of a poly(ethylene terephthalate)powder (made by Nippon Ester Co. Ltd., [η] = 0.64) were mixed, pelletized and injection molded as in Example 1.

Crazing was not observed after the crazing treatment as in Example 1 or in Example 3.

The tensile impact strength maintenance ratio of the aromatic co-polyester was 90% where poly(ethylene terephthalate) was added, and 15% where no poly(ethylene terephthalate) was added. Further, the inflammability corresponded to 94V-O as in Example 7, and no adverse influence due to the addition of poly(ethylene terephthalate) was observed.

While the invention has been described in detail and with reference to specific embodiments thereof, it will be apparent to one skilled in the art various changes and modifications can be made therein without departing from the spirit and scope thereof.

What is claimed is:

1. A composition showing reduced crazing comprising an aromatic co-polyester and poly(ethylene terephthalate), a. the aromatic co-polyester being a resinous product represented by the formula:

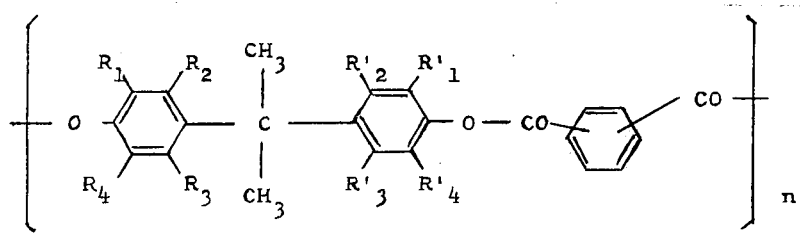

wherein $R_1$, $R_2$, $R_3$, $R_4$, $R'_1$, $R'_2$, $R'_3$ and $R'_4$, which may be the same or different, are members selected from the group consisting of hydrogen, chlorine, and bromine, and n is a positive integer which provides a resinous product;
b. the poly(ethylene terephthalate) being present in an amount of from 0.1 to 4 weight % based on the sum of the weight of said aromatic co-polyester and the poly (ethylene terephthalate); and
c. the moiety

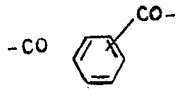

in the above formula being terephthalic acid units and isophthalic acid units, which are present in said aromatic co-polyester at a molar ratio of about 9:1 to 1:9, respectively.

2. The composition as claimed in claim 1, wherein the molar ratio of the terephthalic acid units to the isophthalic acid units is 7:3 to 3:7.

3. The composition as claimed in claim 1, wherein the ratio of the terephthalic acid units to the isophthalic acid units is substantially 1:1.

4. The composition as claimed in claim 1, wherein the logarithmic viscosity ($\eta$inh) of said aromatic co-polyester ranges from about 0.3 to 1.0.

5. The composition as claimed in claim 4, wherein the intrinsic viscosity [$\eta$] of said poly(ethylene terephthalate) ranges from about 0.3 to 1.3.

6. The compositions as claimed in claim 1, wherein the ratio of the terephthalic acid units to the isophthalic acid units is substantially 1:1, said aromatic co-polyester has a logarithmic viscosity ($\eta$inh) of from 0.4 to 0.8 and said poly(ethylene terephthalate) has an intrinsic viscosity [$\eta$] of from about 0.3 to 1.3.

7. The composition showing reduced crazing comprising an aromatic co-polyester and poly(ethylene terephthalate),
a. the aromatic copolyester being a resinous product represented by the formula:

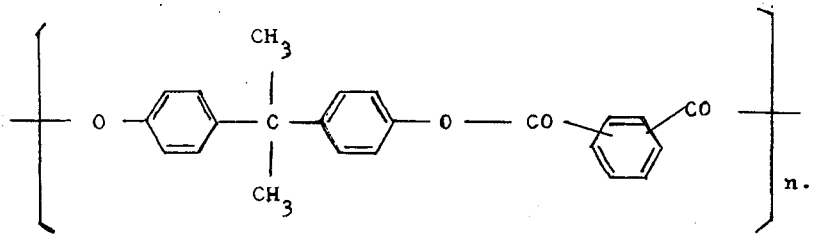

wherein $n$ is a positive integer which provides a resinous product;
b. the poly(ethylene terephthalate) being present in an amount of from 0.1 to 4 weight % based on the sum of the weight of said aromatic co-polyester and the poly(ethylene terephthalate); and
c. the moiety

in the above formula being terephthalic acid units and isophthalic acid units, which are present in said aromatic co-polyester at a molar ratio of about 9:1 to 1:9, respectively.

8. The composition as claimed in claim 7, wherein the ratio of terephthalic acid units to the isophthalic acid units is substantially 1:1.

9. The composition as claimed in claim 7, wherein said aromatic co-polyester has a logarithmic viscosity ($\eta$inh) of from about 0.3 to 1.0.

10. The composition as claimed in claim 7, wherein said aromatic co-polyester has a logarithmic viscosity ($\eta$inh) of from about 0.3 to 1.0 and said poly(ethylene terephthalate) has an intrinsic viscosity [$\eta$] of from about 0.3 to 1.3.

11. The composition as claimed in claim 8, wherein said aromatic co-polyester has a logarithmic viscosity ($\eta$inh) of from 0.4 to 0.8.

12. The composition as claimed in claim 11, wherein said poly (ethylene terephthalate) has an intrinsic viscosity of from 0.5 to 1.1.

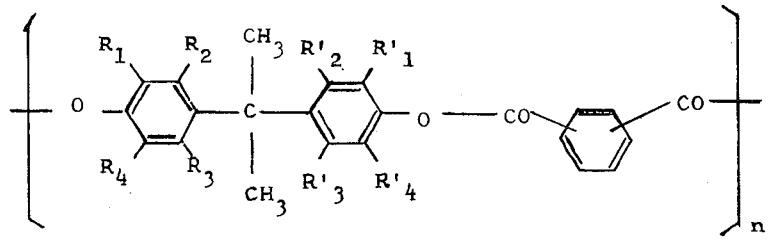

13. A molded article produced from the composition of claim 1.

14. A method for reducing crazing of a molded article of an aromatic co-polyester comprising a resinous product represented by the formula:
wherein $R_1$, $R_2$, $R_3$, $R_4$, $R'_1$, $R'_2$, $R'_3$ and $R'_4$, which may be the same or different, are members selected from the group consisting of hydrogen, chlorine, and bromine, and $n$ is a positive integer which provides a resinous product;
comprising blending from 0.1 to 4 weight % of poly(ethylene terephthalate) therewith, based on the sum of the weight of said aromatic co-polyester and said poly(ethylene terephthalate), prior to molding.

* * * * *

UNITED STATES PATENT AND TRADEMARK OFFICE
CERTIFICATE OF CORRECTION

PATENT NO. : 3,946,091
DATED : March 23, 1976
INVENTOR(S) : Hiroshi Sakata, Takashi Okamoto and Hirozo Hasegawa It is certified that error appears in the above-identified patent and that said Letters Patent are hereby corrected as shown below:

Column 16, line 1, delete "in Example 7, except 1.31 Kg of 2,2-bis(4-hydroxy-3,5-";

Column 16, line 2, delete "dibromo phenyl)propane was used instead of 0.88 Kg";

Column 16, line 3, delete "of 2,2-bis(4-hydroxy-3,5-dichloro phenyl)propane.";

Column 16, line 4, delete "The molar ratio of 2,2-bis(4-hydroxy phenyl)propane";

Column 16, line 32, after "prepared as" insert --in Example 7, except 1.31 Kg of 2,2-bis(4-hydroxy-3,5-dibromo phenyl)propane was used instead of 0.88 Kg of 2,2-bis(4-hydroxy-3,5-dichloro phenyl)propane . The moler ratio of 2,2-bis(4-hydroxy phenyl) propane --.

Column 18, line 32, delete the formula after "to 1.1" at line 31.

Column 18, line 46, after "the formula:" insert the formula of Claim 12 appearing at lines 32 thru 41.

Signed and Sealed this

First Day of February 1977

[SEAL]

Attest:

RUTH C. MASON
Attesting Officer

C. MARSHALL DANN
Commissioner of Patents and Trademarks